United States Patent [19]
Meckley

[11] Patent Number: 5,309,520
[45] Date of Patent: May 3, 1994

[54] SIGNAL PROCESSING SYSTEM USING RECURSIVE RADON VIDEO TRANSFORM PROCESSOR

[75] Inventor: John R. Meckley, Voorhees, N.J.

[73] Assignee: General Electric Co., Morrestown, N.J.

[21] Appl. No.: 809,111

[22] Filed: Dec. 16, 1991

[51] Int. Cl.⁵ .......................... G06K 9/36; G06K 9/64; G06K 9/32; G06K 15/00

[52] U.S. Cl. ...................................... 382/41; 382/42; 382/46; 364/413.19; 364/413.21; 364/421

[58] Field of Search .................... 382/41, 42, 46, 54; 358/93; 378/901; 364/413.15, 413.16, 413.19, 413.21, 421, 516; G06K 9/00, 9/36, 9/64, 9/32, 9/40, 15/00; H04N 7/18

[56] References Cited

U.S. PATENT DOCUMENTS

| | | | |
|---|---|---|---|
| 4,766,574 | 8/1988 | Whitmore, Jr. et al. | 364/421 |
| 4,930,076 | 5/1990 | Meckley | 364/413.21 |
| 5,101,270 | 3/1992 | Boone et al. | 382/42 |
| 5,124,914 | 6/1992 | Grangeat | 364/413.19 |
| 5,136,660 | 8/1992 | Flickner et al. | 382/46 |

Primary Examiner—Jose L. Couso
Attorney, Agent, or Firm—W. H. Meise; G. H. Krauss; S. A. Young

[57] ABSTRACT

A recursive Radon video transform processor, for detecting signal responses from objects to be recognized, generates a special manifold of the response data for Radon transformation of the stored data before operation thereon by a subsequent enhancement process, prior to display or other utilization. Each Cartesian data point contributes to multiple Radon transforms, so that the recursive Radon transform video implementation only processes the newest and oldest lines of data to update the transform for a given sliding window in the data manifold. For a data line of fixed length $p$, and with each of a set of N separate angular subprocessors operating, the pixel X value of the first and the last data rows are offset by a window size ($w = x^* \tan \theta_i$), where $\theta_i$ is the transform angle for a particular subprocessor, as determined by a desired resolution, so that window size variations are implemented by a programmable change in time delay.

10 Claims, 2 Drawing Sheets

SIGNAL PROCESSING SYSTEM USING RECURSIVE RADON VIDEO TRANSFORM PROCESSOR

This invention relates to signal processing apparatus using the Radon transform of a signal and, more particularly, to novel apparatus for recursively generating the Radon transform of a set of signals windowed on a continuously-incremented data manifold.

BACKGROUND OF THE INVENTION

Many modern forms of information sensing systems (particularly those in the "internal-imaging" sciences, such as computer-aided tomography (CAT) scanning and nuclear magnetic resonance (NMR or MRI) imaging, or the more "external-imaging" sciences, such as radar, sonar and the like) utilize beams of various energies to interrogate a sample and provide response information which is to be processed to form a user-viewable image in which specific objects are to be recognized. All of the response signals are obtained with an undesired noise contribution; there have been many and varied signal processing methods provided over the years for operating on the sensed data, so as to provide a display with the highest attainable signal-to-noise ratio. One method to realize this, as well as other, signal processing goals utilizes the Radon transform $R(\rho,\theta)$, which is a projection of all line integrals (each at a different distance $\rho$ from an origin) orthogonal to the $\rho$ line and at an angle $\theta$ with respect to one of the axes of the signal data space; thus, as is known to the art $$R(\rho,\theta) = \int\int I(x,y)\delta(\rho - x^* \cos\theta - y^* \sin\theta)dx\,dy,$$

where the inner integral lower and upper bounds are respectively $x_l$ and $x_u$ (the lower and upper sides of the data space) and the outer integral lower and upper bounds are respectively $y_l$ and $y_u$ (the bottom and top sides of the data space) and $I(x,y)$ is the amplitude, or intensity, of the signal at pixel $(x,y)$. A particularly useful Systolic Radon Transform Processor was described and claimed in my U.S. Pat. No. 4,930,076, issued May 29, 1990, assigned to the assignee of the present invention and incorporated herein in its entirety by reference.

In many systems, the response data is presented as a series of "snapshots" in a continuously-incremented data manifold, i.e. with each snapshot being one of a multiplicity of sequential line sets of data each taken at one of a series of sequential time intervals and arranged as a two-dimensional (data vs. time) space. The data can be placed in the manifold in either its original form or can be transformed first in accordance with some selected transformational process (e.g. by taking the frequency transform of the amplitudes, and the like). The transformed data set at any one time is set forth as a line parallel to one axis (say, the +D axis) and the various data/transform sets are sequentially provided perpendicular to the time (say, +T) axis, orthogonal to the data D axis, with a time interval $\Delta T$ therebetween. I have found it advantageous to window the manifold and provide the Radon transform of the set of the data lines contained in that window for further processing for detection of coherent features. It is therefore highly desirable to provide a Radon video transform processor which will recursively process each entire window of data, as the window advances in time, in a manner which will properly account for the newest data line, provided at the latest time interval, while removing the oldest line of data from the present data window.

BRIEF SUMMARY OF THE INVENTION

In accordance with the present invention, a recursive Radon video transform processor, for detecting in the presence of noise signal responses from objects to be recognized, generates a special manifold of the response data, for Radon transformation of the stored data to a subsequent filter enhancement means, prior to display or other utilization. Each Cartesian data point contributes to multiple Radon transforms, so that a recursive Radon transform implementation need only process the first and last lines of data to update the transform for a given sliding window in any data manifold. For a data line of fixed row length $\rho$, and with each of a set of N separate angular processors operating, the pixel X value of the first and the last data rows are offset by a window size ($w = x^* \tan\theta$), where $\theta$ is the transform angle for a particular processor, as determined by the desired resolution angle $\Delta$, with $\theta_N = N\Delta$, where $0 \leq \theta_N \leq 180°$, so that any window size variation can be implemented as a time delay variation.

In a presently preferred embodiment, a specific Radon processor implementation, utilizing a set of window processors of first common form for positive transform angle and of a second (modified) common form for negative transform angles, is provided with updatable memory, in which the data from all lines of the present window are stored and sequentially read-out for filtering and enhancement after a newest line of data is shifted into the memories of the window processors, and the oldest data line is shifted out of the window processor memories.

The objects of the present invention will be apparent to those skilled in the art upon reading the following detailed description of the presently preferred embodiment, when considered in conjunction with the associated drawings.

DETAILED DESCRIPTION OF THE INVENTION

Figure 1:
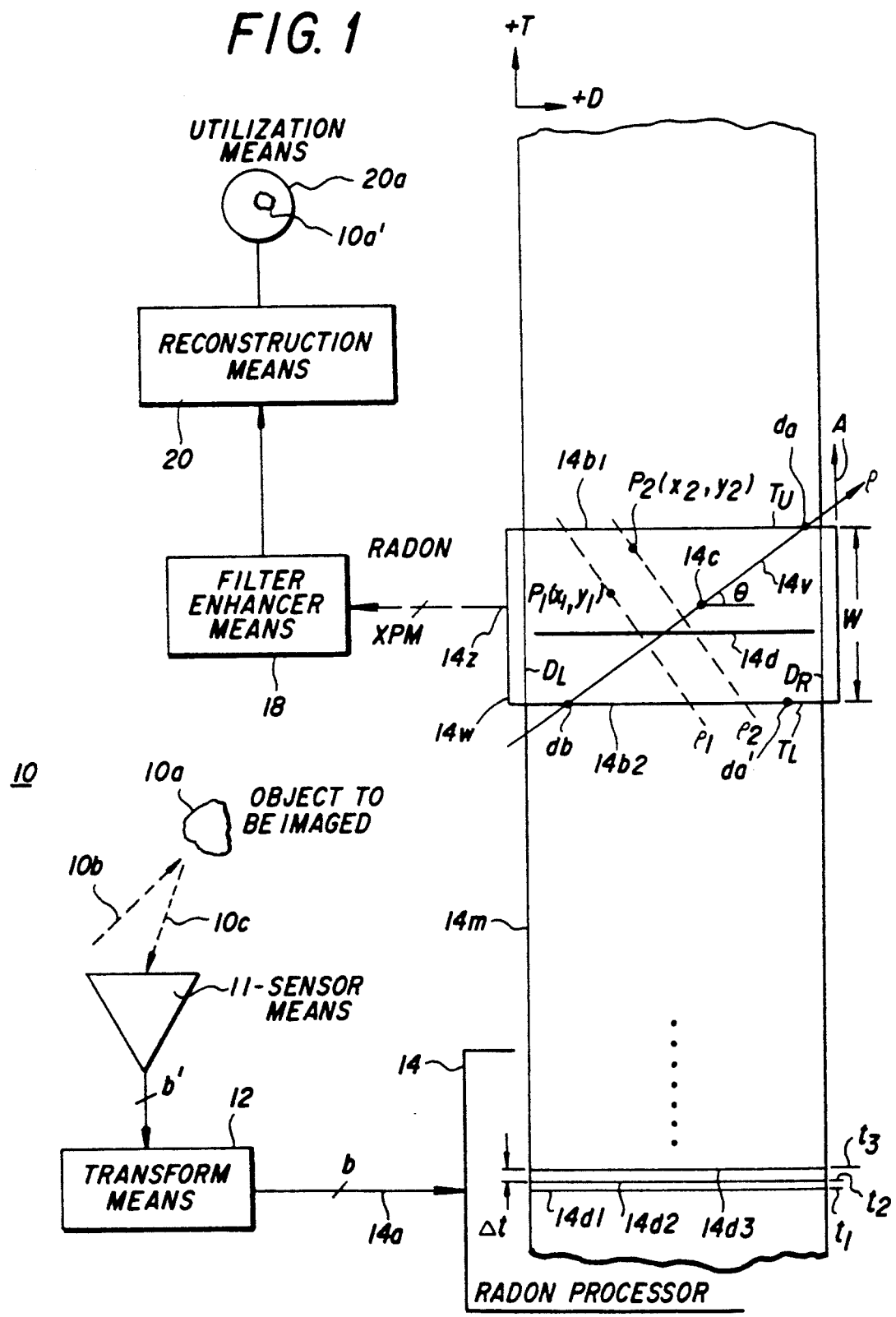
FIG. 1 is a schematic block diagram of a recursive Radon transform processor in accordance with the principles of the present invention.

FIG. 1 illustrates, in block diagram form, a system 10 for providing processed data obtained from an object 10a-to-be-imaged, via a sensor means 11. Means 11 provides an output in digital form (say, of b' parallel bits width) of any response data obtained from an interrogating energy beam 10b causing a return signal 10c to be received by sensor 11 (whether the modality be X-rays, as in a CAT scan, radio frequency signals, as in radar, sound signals, as in sonar, or a combination thereof, such as the combined magnetic and RF fields in a NMR imaging system). The sensed data is transformed in a transform means 12 into words (of, say, b bits) of information, describing a response signal amplitude, at a particular time, in some domain (say, the frequency-domain transform of the intensity data originally provided by sensor means 11 is provided as an amplitude vs. frequency set of data from means 12). The transformed data is provided to the input 14a of a Radon transform processor means 14. Each set of a plurality Z words of transformed data, taken at any one time $t_{set}$, is stored in a memory space, or manifold, 14m of the processor, as a series (or line 14d) of one-dimensional transformed-data values (say, in the data +D dimension) for each of a multiplicity of sequential instants of time (say, sequential times $t_1, t_2, t_3, \ldots$ having constant time separation $\Delta t$ from each other). Thus, all of the Z words of transformed data obtained at some time $t_1$ are stored in an associated data line 14d1, while the Z words of transformed data received by means 14 at a second time $t_2$ are stored in a second data line 14d2, and the Z data words received at a third time $t_3$ are stored in a next subsequent line 14d3, and so forth. A selected portion, or "window" 14w of the manifold 14m of two-dimensional transformed-data/time lines can be entered and processed to obtain information as to the response, relative to only the latest W lines of data, where W is the width of the rectangular window 14w. The window thus commences at a first time (which may, but need not, be the present) represented by an upper T-axis value $T_u$, along line 14b1, and terminates at an earlier time represented by an lower T-axis value $T_l$, along line 14b2. Each of the multiplicity of points $P_n(x_n, y_n)$ within window 14w contributes to many different parts of the Radon transform, as the transform angle $\theta$ varies and for all values of the transform vector 14v described by length $\rho = x \cos \theta + y \sin \theta$, between the upper and lower X and Y bounds of the window. Thus, for each increment of the angle $\theta$ that vector 14v makes with respect to the +D axis at vector origin 14c, any one data point (say, point P1) contributes at some Radon vector magnitude (say, $\rho_1$) and another point (say, point P2) contributes at some other Radon vector magnitude (say, $\rho_2$), with the magnitudes $\rho_1$ and $\rho_2$ changing as the Radon vector angle $\theta$ changes. For practical use, data need only be processed as angle $\theta$ varies over a semi-circular span. Therefore, if, for example, adequate resolution can be obtained with angular increments of $\Delta = 0.5°$ in a CAT scan application, then $n = 180/\Delta = 360$ angular increments (each with its own associated window-angle processor) need be provided from $\theta_1 = +90°$ through $\theta_n = -(90 - \Delta)°$, or $-89.5°$ where resolution is taken in 0.5° increments, as previously explained in the aforementioned U.S. Pat. No. 4,930,076. The resulting Radon transform for window 14w is recursively provided at each separate time, with the most recent, or newest, data line 14b1 being added and the least recent, or oldest, data line 14b2 of an immediate-previous window being deleted from the next-subsequent (present) window. The present-window Radon transform is thus provided at a processor output 14z for data filtering and enhancement in a filter enhancement means 18 (as by frequency highpass/bandpass operation, baseline data clipping operation and the like). The filtered and enhanced Radon-transformed data is then provided to a reconstruction means 20, for regenerating an image by the inverse Radon transformation, so that enhanced images may be evaluated (as by an observer viewing the reconstructed object 10a' in a display means 20a).

Figure 2:
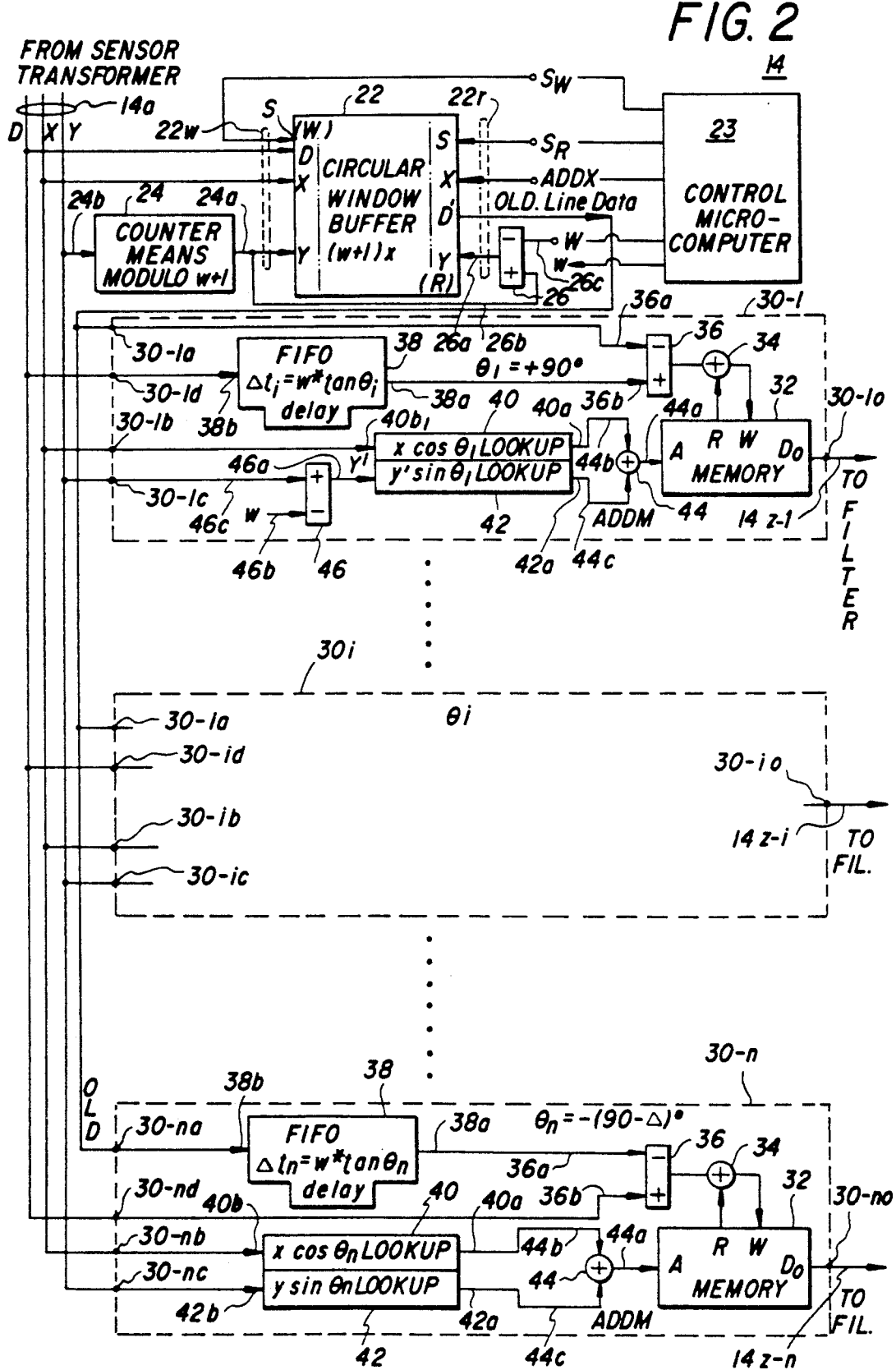
FIG. 2 is a schematic block diagram of one presently preferred form of Radon processor subsystem for use in the system of FIG. 1.

Referring now to FIG. 2, Radon processor 14 receives the transformed sensor amplitude data D, along with the X and Y coordinates of each point (pixel) for which the intensity data D is provided, at an input port 14a. Processor 14 includes a window data buffer 22, with an input, or data-write, port 22w having: at least one data input line D each connected to the associated one of data D lines of processor port 14a; at least one X address line each connected to the associated one of the X data lines of input port 14a; a write strobe S input receiving a data-write Strobe $S_W$ signal from a processor control microcomputer 23; and at least one Y address input line receiving remainder data from the at least one output lines 24a of a modulo-(w+1) counter means 24, having its division modulus w set by microcomputer 23 and its input lines 24b connected to the Y pixel address lines at processor input port 14a. Window buffer 22 also has an output, or data-read, port 22r from which the oldest line data appears on data lines D', when a read strobe $S_R$ is sent by control microcomputer 23 to the strobe S input of the read port, for addresses of some X value as provided at an ADDX input from control microcomputer 23, and some Y value provided at the output 26a of a data subtractor means 26. Means 26 receives at its additive input 26b the Y address remainder value (the input Y value after counting by modulo-(w+1)) from counter output 24, and also receives from control microcomputer 23 the window width W size data at subtracted input 26c. By controlling the present magnitude of W and w, the processor microcomputer can programmably set the size of the window 14w. Buffer 22 is of circular form, with the address pointer for each of the write port and the read port moving in a continuous wrap-around fashion so that at the end of the memory address space, the pointer wraps around from the last memory-space address to the first memory-space address in sequentially continuous fashion. The size of the window buffer is (w+1) addressable lines, where (w+1)>W the window size, and where each of the (w+1) lines accommodates Z words of data, as one data line 14d (see FIG. 1) of the memory space contains Z data words. Thus, while the newest line of data is being read into the window buffer, at a location determined by the present remainder value after modulo-(w+1) division, provided by counter means 24, the oldest line of data in window 14w is read out of the other port 22r, in accordance with the window width W value provided to input 26c.

Processor 14 also includes an array of N individual window-angle subprocessor means 30-i, each assigned for processing data for a single resolution-angle $\theta_i$, where $1 \leq i \leq N$. Typically, $\theta$ need range only over a semicircular arc, so that for a resolution $\Delta$ the $n = 180/\Delta$ subprocessors 30-i can be arranged substantially for ±90° coverage; i.e. with almost equal positive and negative angular excursions about the $\theta = 0°$ line. All of the subprocessors 30-i for positive angles (i.e. from subprocessor 30-1 for angle $\theta_1 = +90°$, with each subsequent subprocessor being provided for a positive angle decremented by $\Delta°$ from the previous subprocessor, down through subprocessor 30-(n/2) for $\theta = +\Delta°$, and subprocessor 30-(n/2)+1 for $\theta = 0°$) are of a first form, as illustrated for subprocessor 30-1. Each of the remaining subprocessors 30-(n/2)+2 through 30-n for negative angles from $\theta_n = -\Delta°$ through $\theta_n = -(90 - n\Delta)°$ is of the form shown for negative-angle subprocessor 30-n.

Each of the subprocessors, whether of positive or negative form, receives the oldest line data, from circular window buffer output 22r data lines D', at an input 30-ia. The subprocessor also receives the present pixel X location value at a subprocessor input port connection 30-ib and the corresponding Y pixel address at subprocessor input connection 30-1c; the present pixel data D information is provided at a processor input connection 30-1d. Each subprocessor 30-i contains a memory means 32 storing the W lines of present transformed window data for the particular θi value assigned to that processor. Each memory means 32 has an address ADDM input port receiving information determining the address of the line of data to be presently accessed and appearing at the read R output port. The read-out data is combined in an adder means 34 with new data, provided from the output of a subtractor means 36, to generate new data for the latest manifold line, which latest line data is written into the write-data W port of the memory. The present line data appears at a data D output port of the memory means and is coupled to the output 30-io of that one of the subprocessor means and thence to an associated one 14z-i of the n data lines from processor output 14z to filter enhancer means 18.

One of the subtractor 36 inputs receives data directly from an associated subprocessor means input port while the other subtractor input receives input port data after a delay $\Delta t_i$, unique to that subprocessor means and dependent upon the angle $\theta_i$ thereof. This delay is provided by a first-in-first-out register means 38 having a delay $\Delta t_i = w^* \tan \theta_i$. The time delays of FIFO means 38 are necessary to prevent a data point, such as data point $d_a$ which commences along the intended vector 14v, from moving to an undesired point $d_a'$, off of the intended vector, as window 14w moves in the direction of arrow A; the time delay moves the effective data point to a point $d_b$ which remains on the desired signal vector. The additional delay must be proportional not only to the window size w, but also to the tangent of the processing angle $\theta$.

In the positive-$\theta$ array subprocessors 30-1 through 30-(n/2)+1, the subtractor first (subtractive) input 36a is connected directly to the oldest line data input port 30-ia and the subtractor second (additive) input 36b is connected to the delay means output 38a, while the delay means input 38b is connected to data input port 30-id; in the negative-$\theta$ array subprocessors 30-(n/2)+2 through 30-n, the angle polarity is reversed and so are the subtractor input connections, with the second (additive) input 36b connected directly to the new line data input port 30-id and the subtractor first (subtractive) input 36a connected to the delay means 38 output, while the delay means input 38b is connected to data input port 30-ia. In each array processor 30i, the memory address ADDM information is provided at the output 44a of a two-input adder means 44; a first input 44b receives the data from an output 40a of a first lookup memory means 40, while a second adder input 44c receives the data from an output 42a of a second lookup memory means 42. First lookup memory 40 provides the x-related portion ($x^* \cos \theta_i$) of the $\rho$ value utilized for the ADDM address data, where x is the data value at input 40b from the sensor x input port 30-ib of the array processor means. The second lookup memory 42 provides the other (y-related) half of the ADDM address data, as the product of $\sin \theta_i$, for the $\theta_i$ of that one of the array processes, times the y or y' data input at lookup memory input 42b. In the negative $\theta_i$ subprocessors, the Y information from input port 30-ic is directly coupled to the lookup memory input 42b; in the positive $\theta_i$ array subprocessors, the input 42b receives y' data, at the output 46a of another subtractor means 46. This other subtractor means 46 has a first input 46a receiving the w data from the processor controlling microcomputer 23, and receives the sensor Y data from input port 30-ic at the additive input 46c. Since $\theta_i$ is fixed and constant for each processor 30i, the proper constants for tangent $\theta_i$, cosine $\theta_i$ and sine $\theta_i$ can be permanently utilized in respective memories 38, 40 and 42.

While one presently preferred embodiment of my novel recursive Radon video transfer processor has been described in some detail herein, many modifications and variations will now become apparent to those skilled in the art. It is my intent, therefore, to be limited only by the scope of the impending claims and not by the specific details and instrumentalities presented by way of explanation herein.

What I claim is:

1. An apparatus for performing a radon transform on sets of input signals, said input signals including components representing a current pixel value of a line-scanned frame and components representing the Cartesian coordinates of said current pixel, said apparatus comprising:

a memory for storing said current pixel value components of said input signal at addresses relating to the corresponding ones of said Cartesian coordinates, for thereby producing stored signals, and for reading said stored signals at a predetermined time after their storage, to thereby produce delayed signals; and at least one window subprocessor unit, said window subprocessor unit comprising
  (a) summing means including first and second noninverting input ports, an inverting input port, and an output port, said first noninverting input port being coupled for receiving said current pixel value component of said input signal, said inverting input port being coupled to said memory for receiving said delayed signals therefrom, and said second noninverting input port being coupled for receiving a signal representing the current value of a radon transform value at a particular value of $\rho$ and $\theta$, for subtracting said delayed signals from said current pixel value signals component of said input signals, to produce a difference signal representing the difference between pixel values of a current line of said frame and pixel values of a line of said frame preceding said current line by said predetermined time, and for summing said difference signal with said current value of a radon transform value to thereby produce a summed signal at said output port; and
  (b) radon transform generating means including an input port and an output port, said input port being coupled to said output port of said summing means for receiving said summed signal therefrom, for performing a radon transform thereon for said particular value of $\theta$, to produce said current value of said radon transform value, and for applying said current value of said radon transform value to said second noninverting input port of said summing means.

2. An apparatus according to claim 1, wherein said memory includes storage capability in excess of that required for storing said current pixel value components of said input signal over said predetermined time, and wherein said memory further includes an address input port for receiving address signals, said apparatus further comprising:

modulo counting means including an input port coupled for receiving the current one of at least one of said Cartesian coordinates, and for counting said one of said Cartesian coordinates modulo-W, where W is selected to establish said predetermined time, for generating said address signals, and for coupling said address signals to said address input port of said memory.

3. An apparatus according to claim 1, wherein said window subprocessor unit further comprises;

a FIFO delay coupled to one of said first noninverting input port and said first inverting input port of said summing means, for delaying one of said current pixel values component of said input signal and said delayed signals for a time equal to the product of said predetermined time multiplied by the tangent of said associated one angular increment $\theta_i$.

4. An arrangement according to claim 1, wherein said processing means includes:

a plurality N−1 of additional window subprocessor units, each receiving new information from said memory, for providing Radon transform output information for an associated one angular increment $\theta_i$, for $1 \leq i \leq N$.

5. An arrangement according to claim 4, wherein the number N of said subprocessor units is determined by $180/\Delta$, where $\Delta$ is a desired angular resolution.

6. An arrangement according to claim 5, wherein $\Delta = 0.5°$.

7. An arrangement according to claim 6, wherein a first one of said subprocessor means has a fixed $\theta_1$ of about $+90°$.

8. An arrangement according to claim 4, wherein the time delay means in each i-th subprocessor unit provides a delay time $\Delta t_i$ unique to that subprocessor unit.

9. An arrangement according to claim 8, wherein the i-th time delay $\Delta t_i$ is given by the product of the tangent of the subprocessor angle $\theta_i$ and the selected predetermined time.

10. An arrangement according to claim 3, wherein said FIFO delay delays said current pixel values component of said input signal in the subprocessors for positive and zero angles $\theta_i$, and delays said delayed signals in the subprocessors for negative angles $\theta_i$.

* * * * *